United States Patent [19]

Takagi

[11] Patent Number: 5,696,844
[45] Date of Patent: Dec. 9, 1997

[54] OUTLINE PATTERN DATA EXTRACTION DEVICE FOR EXTRACTING OUTLINE PATTERN OF A PATTERN DISTRIBUTION IN A MULTI-DIMENSIONAL FEATURE VECTOR SPACE AND ITS APPLICATIONS

[75] Inventor: Hideyuki Takagi, Kyoto, Japan

[73] Assignee: Matsushita Electric Industrial Co., Ltd., Osaka, Japan

[21] Appl. No.: 249,926

[22] Filed: May 26, 1994

Related U.S. Application Data

[63] Continuation of Ser. No. 880,006, May 8, 1992, abandoned.

[30] Foreign Application Priority Data

May 14, 1991 [JP] Japan .................. P 3-107805
May 17, 1991 [JP] Japan .................. P 3-112991

[51] Int. Cl.$^6$ .................................................. G06K 9/48
[52] U.S. Cl. ................................. 382/199; 382/225
[58] Field of Search ............................ 382/225, 199, 382/197, 203, 204, 224

[56] References Cited

U.S. PATENT DOCUMENTS

| | | | |
|---|---|---|---|
| 4,566,124 | 1/1986 | Yamamoto et al. | 382/22 |
| 4,771,474 | 9/1988 | Takashima et al. | 382/22 |
| 4,783,829 | 11/1988 | Miyakawa et al. | 382/22 |
| 4,837,847 | 6/1989 | Shirasaka et al. | 382/22 |
| 4,969,201 | 11/1990 | Takasaki et al. | 382/22 |
| 5,050,222 | 9/1991 | Lee | 382/22 |
| 5,125,038 | 6/1992 | Meshkat et al. | 382/22 |
| 5,159,646 | 10/1992 | Kumagai | 382/225 |
| 5,181,259 | 1/1993 | Rorvig | 382/225 |
| 5,197,108 | 3/1993 | Watanabe | 382/22 |
| 5,259,039 | 11/1993 | Akamatsu | 382/225 |
| 5,263,097 | 11/1993 | Katz et al. | 382/225 |
| 5,295,198 | 3/1994 | Maney | 382/225 |
| 5,347,595 | 9/1994 | Bosker | 382/225 |
| 5,375,175 | 12/1994 | Kino et al. | 382/225 |

OTHER PUBLICATIONS

J. Hara et al., *Description and Recognition of Animal Silhouette Image Using Ellipsoid Expansion*, Journal of Electronic Informantion Communication Society, D–II, vol. J74–D–II No. 3, pp.366–375 (1991).

*Primary Examiner*—Joseph Mancuso
*Attorney, Agent, or Firm*—McDermott, Will & Emery

[57] ABSTRACT

There is disclosed a pattern outline data extraction device in which plural pattern feature vectors representing patterns contained in a given pattern distribution are input, a geometric figure containing at least one feature vector on the outer periphery thereof is repeatedly generated to delete possible feature vectors contained within the geometric figure generated and an outline of the given pattern distribution is identified with feature vectors not having been deleted. An outer surface detection device and a pattern recognition device are also disclosed as applications of the pattern outline data extraction device.

5 Claims, 7 Drawing Sheets

OUTLINE PATTERN DATA EXTRACTION DEVICE FOR EXTRACTING OUTLINE PATTERN OF A PATTERN DISTRIBUTION IN A MULTI-DIMENSIONAL FEATURE VECTOR SPACE AND ITS APPLICATIONS

This is a continuation of application Ser. No. 07/880,006 filed May 8, 1992, now abandoned.

BACKGROUND OF THE INVENTION

The present invention relates to an outline pattern data extraction device that handles patterns such as speeches, characters, figures, images and the like distributed non-uniformly in a pattern feature vector space and extracts patterns positioned at the outside perimeter (outside surface) of that pattern distribution, and a data compression device, a contour detection device, a spatial overlapping detection device, and a pattern recognition device, each of which uses outline pattern data.

The term "pattern" referred to in the description hereinbelow is defined by plural feature quantities, and defined as a single point in a feature space defined by these quantities.

One representative method for handling outline patterns is an image edge detection (See, for example Basics of Image Recognition II: feature extraction, edge detection, texture analysis, Mori, et al., Ohm-Sha, 1990). This technology detects edges in a defined region of a two-dimensional image input by means of a camera in which individual edges are detected by comparing adjacent pixels arrayed in a uniform mesh pattern.

One conventional data compression device is the facsimile machine, which uses run length encoding (Data Theory: basics and applications, Kasahara et al., Shokodo, 1985). Simply stated, this device sequentially transmits the number of successive white pixels and the number of successive black pixels.

A conventional contour detection device is a device which applies the edge detection technology described above.

A conventional spatial overlapping detection device uses a technique of determining the presence of intersections of surfaces and lines based on the hypercurve surfaces (outline curves if in two-dimensional space) obtained by the aforementioned edge detection technology.

Furthermore, a conventional recognition device is, in the most basic implementation, a recognition device that references multiple templates. The multiple template-based recognition method is described below as applied to character recognition.

First, samples of numerals and letters written by many different people are collected to obtain the pattern feature quantities which define the recognition units. In the character recognition process, each letter is spatially divided and characters ate recognized by using the density of each division or interpreting angle and length information as feature quantities; in voice recognition, the parameters associated with linear prediction analysis are frequently used as the feature quantities. In addition, it is common for the feature quantities to be vectors with plural elements.

The average of the feature quantity vectors of plural sample patterns are obtained for each character in the recognition set. These average feature vectors may be seen as the unbiased, average character (numerals or letters) information from plural people, and may therefore be applied as standard recognition templates. Certain characters have a pattern distribution which makes it preferable to define plural templates rather than a single standard template. In these cases, clustering is used to separate each character into plural classes, and to generate standard templates for each class.

Recognition methods obtain the distance between the feature quantity vector of the input character to be recognized and the standard templates, and assigns as the recognition result that character corresponding to the closest standard template.

What is common to the above recognition technologies, however, is that the pattern is assumed to be uniformly arrayed in a uniform mesh-like pattern over the feature vector space. In most pattern processing, however, the pattern is non-uniformly distributed over the feature vector space as represented by common pattern recognition, and the pattern is not as dense as the pixels in a regular TV image. To present, there have been no technologies available which can handle outline patterns when the distribution is coarse and not uniform.

One feature of the recognition method used in this conventional pattern recognition device is that the complete pattern distributed in the feature vector space is represented as a single point defined by an average vector. While this does enable significant data compression, it is not possible to retain all of the information relating to the original pattern distribution shape. While this creates no problem if the pattern distribution is spheroid, the performance of the template-based recognition method is limited when the pattern distribution is not spheroid.

SUMMARY OF THE INVENTION

Therefore, an object of the present invention is to provide an outline pattern data extraction device which extracts patterns positioned at the outside edge of a pattern distribution in a multiple dimension feature vector space, and a data compression device, outline extraction device, and spatial overlapping detection device which use this outline pattern data. A further object is to provide a pattern recognition device which defines the plural patterns positioned at the outline of the pattern distribution in the multiple dimension feature vector space as the recognition templates, and is able to reflect the original pattern distribution shape in the recognition.

According to the present invention, there is provided a pattern outline data extraction device comprising an outline pattern selector which selects from among pattern data distributed on a feature vector space only that pattern data positioned outward of the pattern distribution by using a geometric shape(s) formed on a feature vector space by one or more of the patterns included in this pattern distribution.

A further facet of this invention is a data compression device comprising the aforementioned outline pattern selector, and a compression data memory area to store the outline patterns for transmission.

Another facet of this invention is an edge detection device comprising the aforementioned outline pattern selector, and an edge surface interpolator which detects hyperplanes or hypercurves approximating the edge surface of the pattern distribution in the defined feature space based on the outline patterns obtained by the outline pattern selector.

A further facet of this invention is a spatial overlapping detection device comprising the aforementioned outline pattern selector, and an overlap detector which determines, using the outline patterns obtained by the outline pattern selector, whether there are any other pattern distributions which overlap the outline pattern data distribution in the feature vector space.

Another facet of this invention is a spatial overlapping detection device comprising an outline pattern storage area which stores the outline pattern data of a pattern distribution obtained by an undefined method, an input pattern storage area which stores plural feature vectors, and the aforementioned overlap detector.

An outline pattern data extraction device thus comprised according to the present invention operates as described hereinbelow. Specifically, one or plural pattern data are selected from among the pattern data distributed in a feature vector space. From the selected pattern data, hypersphere, hyperellipsoid, hyper-rectangular parallelepiped, or other geometric shape is defined in the feature vector space. Using this geometric shape, the outline pattern selector determines whether other pattern data is contained within the geometric shape, and removes any geometric shapes found therewithin. The pattern data remaining after this elimination process comprises the largest geometric shape, and is therefore positioned at the outside of the pattern distribution. It is thus possible to extract the outline pattern data from a given pattern.

A data compression device thus comprised according to the present invention operates as described hereinbelow. Specifically, because the outline pattern selector selects only that outline pattern data which retains the pattern distribution shape from among the many pattern distributions, it becomes possible to compress the data while retaining the original pattern distribution information. Thus, data compression as a system becomes possible by storing this compressed outline pattern data in a compression data storage area for transmission.

An edge detection device thus comprised according to the present invention operates as described hereinbelow. Specifically, the outline pattern data adjacent to the outline pattern data obtained by the outline pattern selector is interpolated by the edge surface interpolator with a hyperplane (or a straight segment line in the case of a two-dimensional feature vector space) or a hypercurvature thereof. It is thus possible to obtain an outline of the pattern distribution in the feature vector space.

A spatial overlapping detection device thus comprised according to the present invention operates as described hereinbelow. Specifically, by applying the same method used by the outline pattern selector to select outline patterns, it is possible to detect a spatial overlapping between the eliminated pattern data and the pattern distribution defined by the outline pattern data obtained by the outline pattern selector if even one of the pattern data associated with another pattern distribution is eliminated in the outline pattern data selection process of the outline pattern selector.

The present invention thus comprised operates as described hereinbelow for pattern recognition. Specifically, when the recognition templates are designed, the distribution of them is searched in a learning data feature vector space, and the feature vectors of the learning data positioned at the outside perimeter of the distribution are selected. This data is then stored in the outline pattern storage area. It is then determined whether the input pattern belongs to the area enclosed by this outline pattern, and if so, the input pattern is recognized as the same pattern as that represented by the associated outline pattern. Recognition in which the original pattern distribution is considered is thus possible.

BRIEF DESCRIPTION OF THE DRAWINGS

The present invention will become more fully understood from the detailed description given below and the accompanying diagrams wherein.

DETAILED DESCRIPTION OF THE PREFERRED EMBODIMENTS

Figure 1:
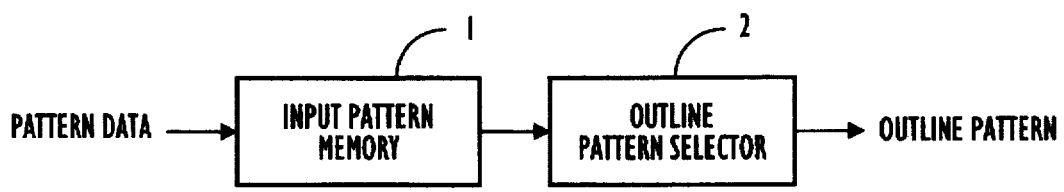
FIG. 1 is a block diagram of a pattern outline data extraction device according to a preferred embodiment of the present invention.

FIG. 1 is a block diagram of a pattern outline data extraction device according to a preferred embodiment of the present invention. As shown in FIG. 1, the pattern outline data extraction device comprises an input pattern memory 1 which stores plural input patterns, and an outline pattern selector 2, which selects from the distribution of patterns stored in the input pattern memory 1 the pattern data positioned on an outer periphery defined by the distribution.

Figure 2:
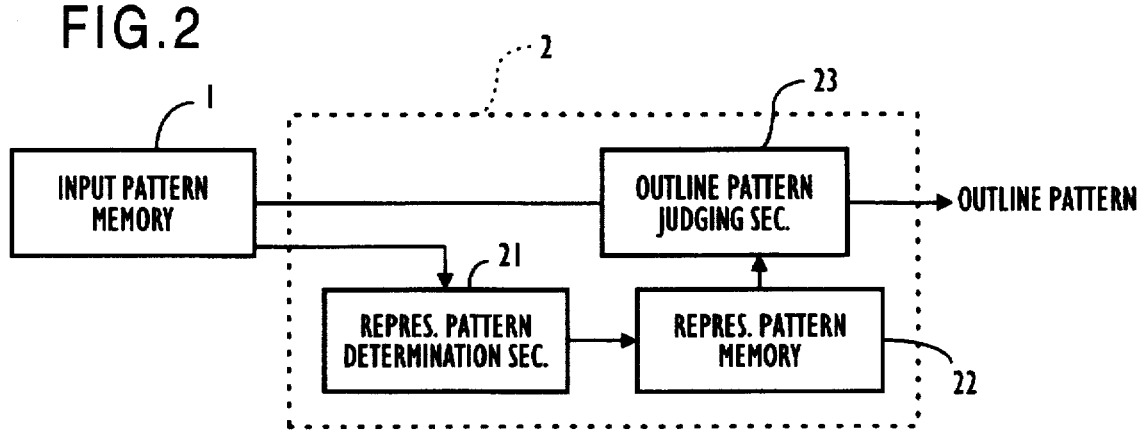
FIG. 2 is a block diagram of the outline pattern selector in the pattern outline data extraction device according to a preferred embodiment of the present invention.

FIG. 2 is a block diagram showing a composition of the outline pattern selector 2 according to the present invention. As shown in FIG. 2, the outline pattern selector 2 comprises a representative pattern determination means 21, which determines the one point which represents the distribution of patterns stored in the input pattern storage area 1, a representative pattern memory means 22, which temporarily stores the representative pattern determined by the representative pattern determination means 21, and an outline pattern judging means 23, which determines the outline pattern data of the pattern distribution using the representative pattern stored in the representative pattern memory means 22 end each of the patterns stored in the input pattern memory storage area 1.

The pattern outline data extraction device according to a preferred embodiment of the present invention as described above operates as follows.

Figure 10:
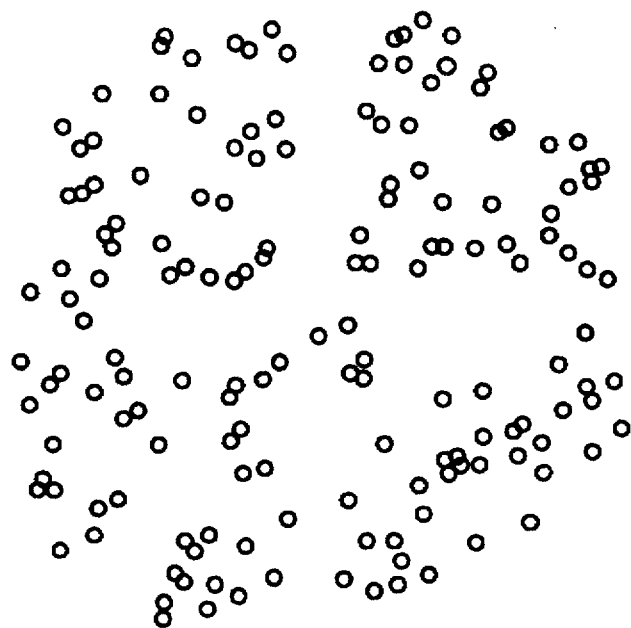
FIG. 10 is an example of a two-dimensional pattern distribution.

The following description will refer to the pattern data shown in FIG. 10. It is to be noted that the pattern distribution in FIG. 10 is given in a two-dimensional feature vector space, but in general a pattern is given as a single point in a multi-dimensional feature vector space. Specific pattern examples include the LPC cepstrum coefficient and filter bank output in audio, and, in character patterns, the character density value of a character overlaid to a mesh and feature quantities such as line bias and length information. Most patterns will be a multi-dimensional pattern. In the following description, the applied algorithms will refer to m patterns existing in an n-dimensional feature vector space, while the specific image will be described using the two-dimensional pattern shown in FIG. 10. If a pattern in the n-dimensional space is expressed by the coordinates in that space, the $\{i\}$ pattern can be expressed by the following equation 1.

$$p_i = (x_{i1}, x_{i2}, x_{i3}, \ldots, x_{in}) \quad [1]$$

The representative pattern determination means 21 in FIG. 2 obtains the one pattern which represents the number m patterns. Most simply, this may also be the gravity center of the pattern distribution. If the gravity center pattern is q, then q can be obtained by the following equation [2]. The elements of the representative pattern q can be obtained by calculating the center of gravity of the elements of m patterns. The representative pattern q thus obtained is stored in the representative pattern memory 22.

$$q = \frac{1}{m} \sum_{i=1}^{m} p_i \quad [2]$$

Figure 11:
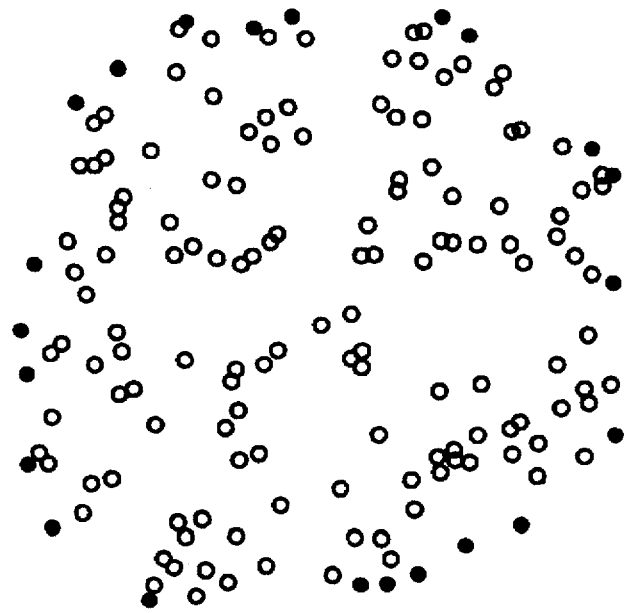
FIG. 11 is an example of the outline pattern extracted from the two-dimensional pattern distribution in FIG. 10.

The outline pattern judging means 23 detects one pattern of m patterns which locates at the outside perimeter using the one representative pattern in the representative pattern memory 22 and the m pattern data in the input pattern memory 1. An example of the outline pattern corresponding to the pattern in FIG. 10 is indicated by the solid dots in FIG. 11. A variety of methods may be used in this determination, and the determination using an ellipse is described hereinbelow.

The outline pattern data determination method using ellipses is outlined below. Assuming an ellipse having a major axis defined between the representative pattern q and an arbitrary pattern $p_i$, all other patterns contained within this ellipse are removed, and this process is repeated for each pattern $p_i$ where i is a value from 1 to m. As a result, patterns which are not contained within any other ellipses remain as one end points of respective major axes of the ellipses, and these patterns form the outline pattern data.

This process is described more specifically below. Consider a hyperellipse wherein the major axis is defined by the representative pattern q and an arbitrary pattern $p_i$, and the (n−1) dimension minor axes are equal to each other. The resulting shape is a perfect football-shaped object in n-dimensional space. The assumption that the (n−1) minor axes lengths are equal is only to simplify the calculations, and the principle applied herein remains valid even if the length of each of the minor axes is different. The ratio of the major axis of the ellipse to the minor axis is 1:c (where $0 < c \leq 1$). When c=1, the resulting object is a hypersphere in n-dimensional space. The outline pattern determination process is described below.

The first step is to move the midpoint of a line segment between q and $p_i$ to the origin of the n-dimensional space. Because the midpoint of the line segment between q and $p_i$ is defined as $(q+p_i)/2$, if the major axis of the ellipse in the new coordinates after this movement are Q and $P_i$, the following equations are obtained:

$$Q = q - \{(\tfrac{1}{2}) * (q+p_i)\}$$

$$P_i = p_i - \{(\tfrac{1}{2}) * (q+p_i)\} \quad [3]$$

Figure 12:
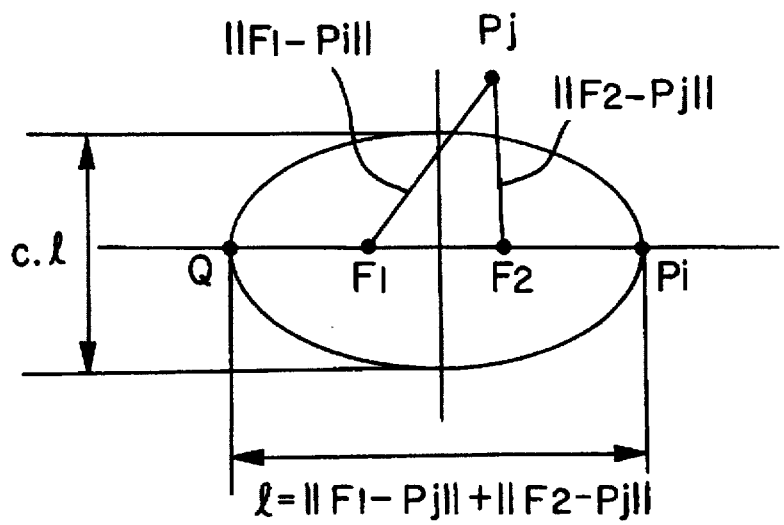
FIG. 12 is an illustration of one relationship between the evaluation pattern data and the ellipse during pattern data extraction using an ellipse.

An example of the moved two-dimensional ellipse is shown in FIG. 12.

Step 2 is to obtain the foci of the ellipse for which the long axis is Q and $P_i$ as defined by equation [4]

$$F_1 = (1-c)^{1/2} * Q$$

$$F_2 = (1-c)^{1/2} * P_i \quad [4]$$

where the foci in the new coordinate system are $F_1$ and $F_2$.

Step 3 is to determine, using these foci and any selected pattern, whether the selected pattern should be eliminated. If the selected pattern is $p_j$ (where $1 \leq j \leq m$, and $j \neq i$), the pattern $p_j$ in the new coordinate system is defined similarly to the equation [3]:

$$P_j = p_j - \{(\tfrac{1}{2}) * (q+p_i)\} \quad [5]$$

From the definition of an ellipse, the sum of the distances from one point on the ellipse to the two foci is equal to the length of the major axis of the ellipse. Thus, if the sum of the two distances from any point is less than the length of the major axis, that point is inside the ellipse, if the sum is greater, that point is outside the ellipse, and if the sum is equal to the length of the major axis, that point is on the surface of the ellipse. Specifically, if the following equation $$\|F_1 - P_j\| + \|F_2 - P_j\| \leq \|Q - P_i\| \quad [6]$$

is satisfied, $p_j$ is inside the hyperellipse defined by the major axis end points q and $p_i$ in the n-dimensional space, and $p_j$ is removed. In the example shown in FIG. 12, $p_j$ is not removed because it is outside the ellipse.

Figure 13:
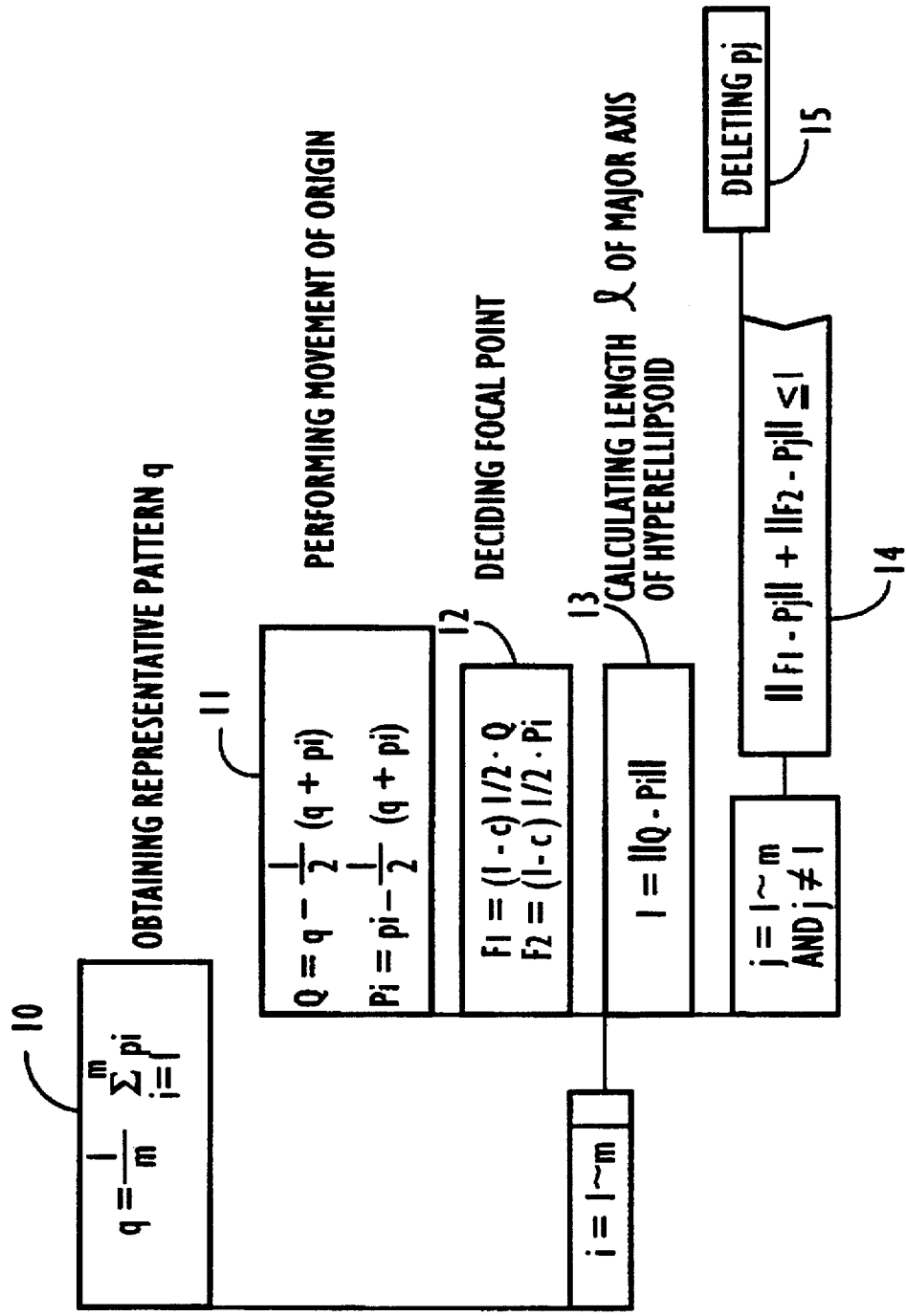
FIG. 13 is a PAD figure showing the flow of the process applied to extract the outline pattern using an ellipse.

By repeating the above process for i=1 to m, only the outline pattern data will remain. The above process illustrated in a PAD diagram is shown in FIG. 13. In FIG. 13, the representative pattern q is obtained at block 10, the origin is moved in block 11, and the foci are obtained in block 12. In blocks 13 to 15, the sum of the distances (Euclidean distance) from one pattern to each of the two foci is obtained, and if the sum is less than the length of the major axis the pattern is removed.

Figure 14:
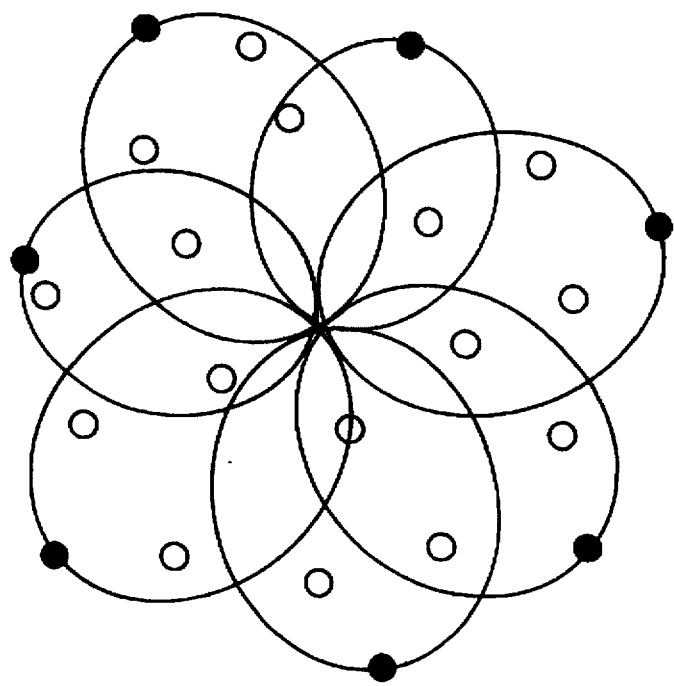
FIG. 14 is an illustration of outline pattern extraction using an ellipse.

FIG. 14 illustrates the manner for removing patterns using ellipses in a two-dimensional feature vector space. In FIG. 14 there are patterns represented by fourteen white dots; the representative pattern q (gravity center) is indicated by a black dot. Taking the fourteen ellipses each having a major axis defined by end points being the representative pattern q and one white dot, the patterns inside each ellipse are removed. In FIG. 14, four patterns are removed and ten outline pattern data are extracted. It is to be noted that it is not necessary to consider all of the m ellipses. If pattern $p_j$ is removed at the last step in FIG. 13, it is not necessary to consider the ellipse of which one end point of the major axis is the pattern $p_j$ removed.

The precision of the outline is determined by the ratio c of the major axis to the minor axis.

In the case that the value of c is large, outline pattern data forming one or more concave parts, if existing in a given pattern distribution, are apt to be removed. In contrast to this, in the case that the value of c is small, it is easy to express convex and concave parts in a given pattern distribution, but the number of pattern data remaining as outline pattern data is increased.

In the present invention as described above, it is possible to select only those patterns on the outside of the pattern distribution in a multi-dimensional feature vector space by providing a representative pattern determination means and outline pattern determination means as the outline pattern selector.

It is to be noted that a pattern outline data extraction device which removes pattern data not on the outside perimeter by applying elliptical bodies using a representative pattern and thus leaves the outline pattern data is used in the above preferred embodiment, but a variety of alternative outline pattern selectors 2 are also possible. For example, it is also possible to remove the data of the input pattern memory 1 contained within by hyperellipsoids by defining each hyperellipsoid with a major axis having two end points arbitrarily selected among the pattern data rather than using a representative pattern. In this case the process applied by the outline pattern selector 2 is essentially the same as that shown in FIG. 13, but the representative pattern is not required.

Furthermore, ellipses are used to determine the patterns which are not the outline pattern, but the present invention shall not be thus limited. A pattern outline data extraction device according to the present invention can be constituted using any determinative geometric shape based on the first embodiment described hereinabove.

Furthermore, the above description assumed the use of only one representative pattern, but any plural number of patterns may also be used. When the pattern distribution is an extremely distorted shape, as illustrated, for example, by the letter "c" wherein there is a significant area enclosed by the pattern distribution, the outline pattern data can be selected with higher precision by applying the geometric shape based on plural representative points.

Figure 3:
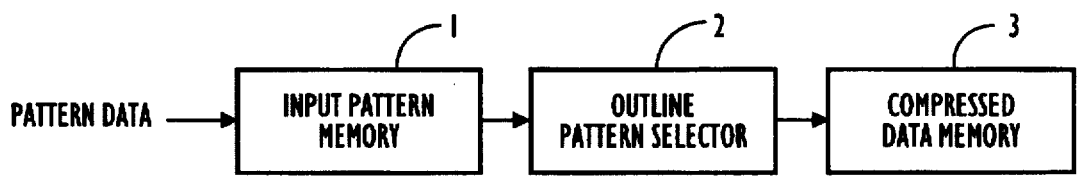
FIG. 3 is a block diagram of a data compression device according to a second preferred embodiment of the present invention.

As shown in FIG. 3, a data compression device according to the second preferred embodiment of the present invention comprises a compression data memory means 3 to store the outline patterns selected by the outline pattern selector 2.

If pattern data with information necessary for reproducing the pattern distribution could be selected among the pattern data stored in the input pattern memory means 1, the original pattern data can be compressed by storing and reproducing the pattern data. The data compression device shown in FIG. 3 uses outline pattern data as representatives of the compressed data.

This data compression device operates by storing the output of the pattern outline data extraction device according to the first part of the present invention in the compressed data memory means 3, which specifically may be a semiconductor memory device, optical disk, magnetic tape, opto-magnetic disk, or other data storage medium.

If the pattern data is stored in the compressed data memory means 3, the pattern distribution can be reproduced by essentially the same principle applied in the outline pattern data determination process illustrated in FIG. 13. Specifically, the center point is obtained using the data stored in the compressed data memory means 3. Using this center point and the outline pattern data, it is possible to determine whether any single point in the feature vector space is inside or outside the pattern distribution. This determination is possible by applying a geometric shape as described with reference to FIG. 13 above. Thus, by generating random pattern data inside the closed geometric shape, that random pattern will be positioned inside the original input pattern distribution. Because a pattern distribution matching the original pattern distribution can be recreated, the data in the compressed data memory means 3 contains the same information as the original pattern distribution, and the data size thereof may be said to be compressed. In other words, the data compression device according to the present invention may be said to be a device which minimizes the elimination of information and compresses only the data size.

One application for this device includes the initial learning of a neural network. A common neural network is trained using all of the provided m data to determine the pattern distribution. Neural network learning generally takes much time, and shortening the required time is a major problem. One way to resolve this problem is to reduce the quantity of training data while retaining the border information of plural pattern distributions. Because the data compression device according to the present invention stores pattern data with precisely this feature in the compressed data memory means 3, the result of the learning essentially similar to that obtained using all of the input patterns can be expected when using this compressed pattern data for learning. Of course, the training time can be expected to be shortened proportionally to the compression of the data size. To increase precision, a final adjustment is to be done using all data obtained by the learning.

By providing a compression data memory means according to the present embodiment, it is possible to store data with a reduced data size while retaining the input pattern distribution information.

Figure 4:
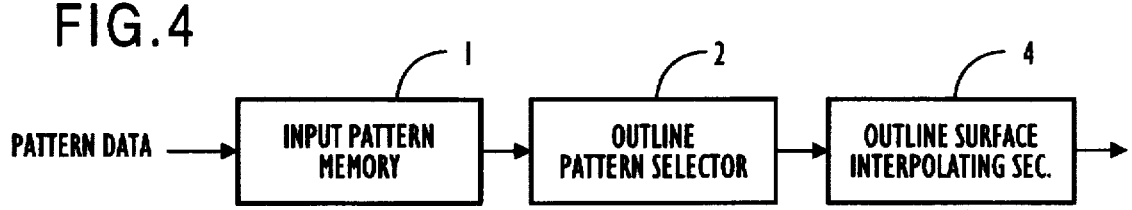
FIG. 4 is a block diagram of an edge detection device according to a third preferred embodiment of the present invention.

FIG. 4 is a block diagram of an edge detection device according to a third preferred embodiment of the present invention. As shown in FIG. 4, this edge detection device comprises an outline surface interpolator 4 which determines the outside surface of the outline pattern, and thus determines the edge of the pattern distribution. When measuring plane shapes or three-dimensional shapes, only a finite number of measurement data can be obtained. The object of the edge detection device according to the present invention is to obtain a continuous edge from this finite number of data points.

The operation of this edge detection device is described below. To generalize the concept, an n-dimensional space is assumed, and the edge is detected from pattern data in this n-dimensional space. The provided pattern data is stored in the input pattern data memory means 1, and the outline pattern data is selected by the outline pattern selector 2. The outline surface interpolator 4 first selects three adjacent joints in the outline pattern data. Once these three points are provided, a plane passing through these three points is defined. If the space is a three-dimensional space (x, y, z), a plane equation $$z = ax + by + c \qquad [7]$$

where the coefficients a, b, and c are constant defines the plane once the three points (x, y, z) are determined in three-dimensional space. The outline surface interpolator 4 uses three adjacent outline pattern data points to determine the plane by applying the equation [7]. By connecting successive triangular planes determined by three successively adjacent points, the outside surface is determined. Edge detection is possible by using this outside surface as the edge.

By providing an outline surface interpolator according to the third embodiment of the invention, continuous edges can be approximated by triangular planes and thus detected.

It is to be noted that in the preferred embodiment of an edge detection device according to the present invention, triangular planes connecting three outline points were obtained, but it is also possible to obtain smooth curves by applying a spline function and to use this for edge detection.

Figure 5:
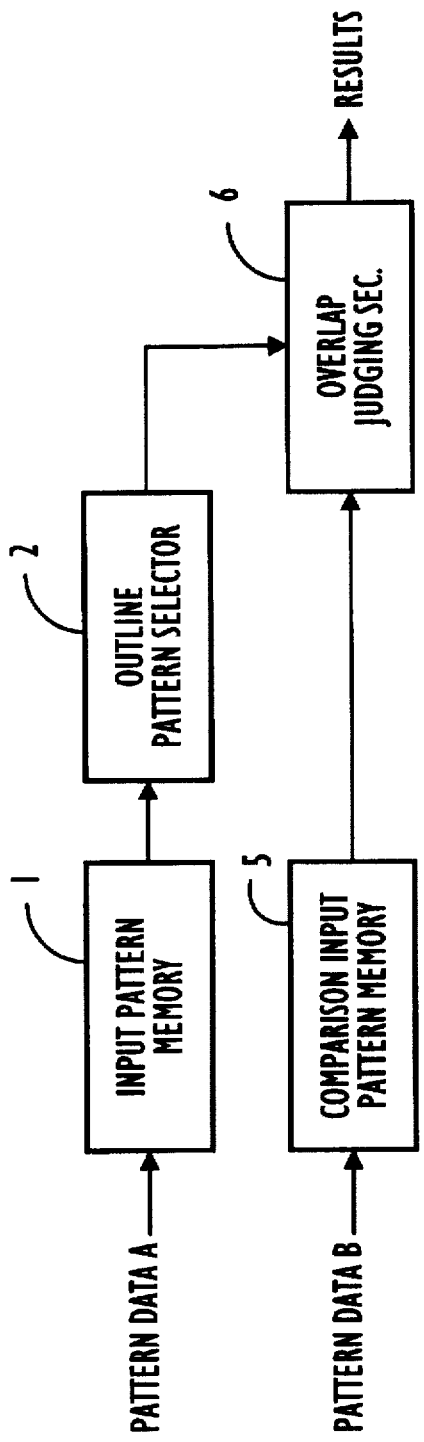
FIG. 5 is a block diagram of a spatial overlapping detection device according to a fourth preferred embodiment of the present invention.

FIG. 5 is a block diagram of a spatial overlapping detection device according to a fourth preferred embodiment of the present invention. As shown in FIG. 5, this spatial overlapping detection device comprises a comparative input pattern memory means 5 to store pattern data to be compared with a reference pattern distribution for spatial overlapping, and an overlap judging means 6 which uses the outline pattern data of the pattern distribution on the comparison reference side to determine if the data in the comparative input pattern memory means 5 overlaps the reference pattern distribution.

The operation of a spatial overlapping detection device thus comprised is described below. The spatial overlapping detection device determines whether two different pattern distributions in an n-dimensional space are overlapping. These pattern distributions are defined in the following description as pattern A and pattern B, and the operation considered is that to determine if the pattern B is overlapping the pattern A.

The outline pattern data of the pattern A used for spatial overlapping comparison is output from the outline pattern selector 2 to the overlap judging means 6. Using the method described with reference to FIG. 13, the overlap judging means 6 determines for each data point in the comparative input pattern memory means S whether the data is within the distribution area of pattern A. In other words, a representative pattern for the pattern A is determined from outline pattern data of the pattern A, and using plural hyperellipses for which the representative pattern and the outline pattern data are the end points of the major axis thereof, it is determined whether each of the data points in the comparative input pattern memory means 5 are inside or outside of the defined hyperellipse from the distance between the foci of each hyperellipse and data points of the comparative input pattern memory means 5. If it is determined that even one of the data points in the comparative input pattern memory means 5 is inside any one of the ellipses, the corresponding pattern B may be concluded to spatially overlap the pattern A. The overlap judging means 6 outputs the result of this determination.

It is therefore possible by means of a spatial overlapping detection device as described above to determine whether two pattern distributions are spatially overlapping.

Figure 6:
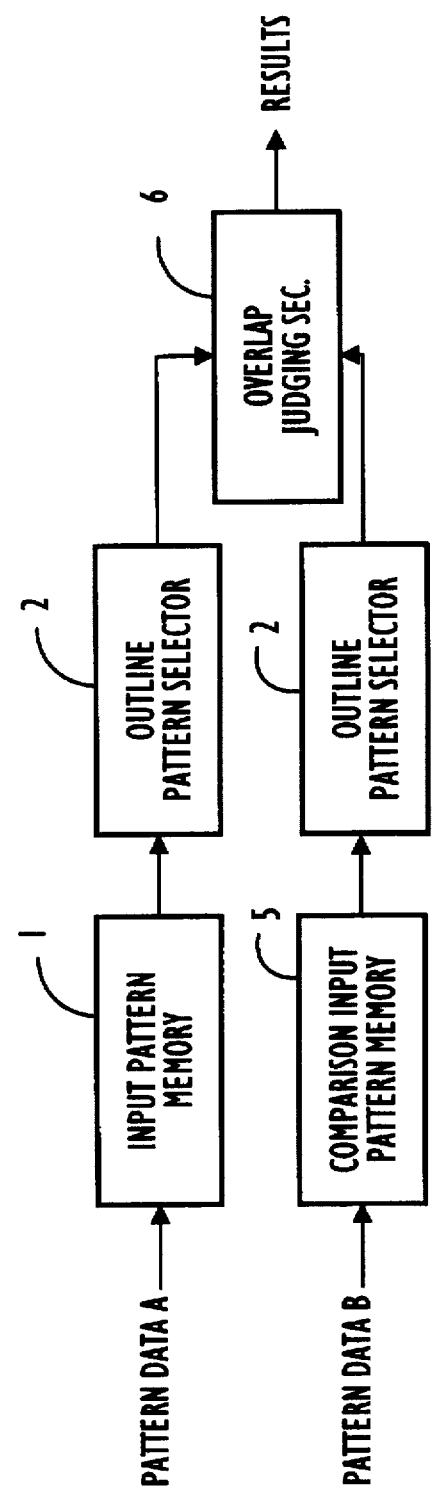
FIG. 6 is a block diagram of a spatial overlapping detection device according to a fifth preferred embodiment of the present invention.

FIG. 6 is a block diagram of a spatial overlapping detection device according to a fifth preferred embodiment of the present invention. The embodiment shown in FIG. 5 evaluates the spatial overlapping of all data comprising the pattern B, but this embodiment determines whether the complete distribution of the pattern B spatially overlaps the distribution of the pattern A by evaluating only the outline pattern data of the pattern B. The outline pattern data of the pattern B is selected by the outline pattern selector 2. When two pattern distributions overlap with each other, outer surfaces of them overlap with each other at first. Thus, overlapping distributions can be sufficiently determined by the outline pattern data only.

According to this embodiment, pattern distribution overlapping can be determined very quickly using less data.

Figure 7:
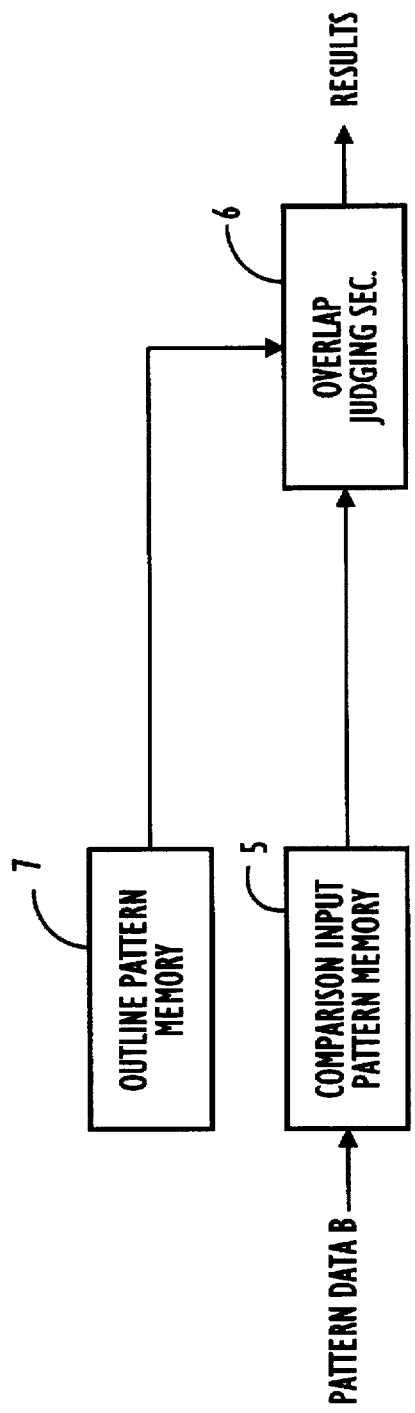
FIG. 7 is a block diagram of an alternative spatial overlapping detection device according to a sixth preferred embodiment of the present invention.

FIG. 7 is a block diagram of a spatial overlapping detection device according to a sixth preferred embodiment of the present invention. As shown in FIG. 7, this spatial overlapping detection device comprises an outline pattern memory means 7 to store outline pattern data of a pattern A, which is the output from the pattern outline extraction device.

A spatial overlapping detection device according to this embodiment as described above does not need to obtain the outline pattern data of the comparison reference pattern A during each comparison when the pattern A against which the patterns from the comparative input pattern memory means 8 are compared is fixed, and the pattern A outline pattern data can be statically stored in the outline pattern memory means 7. This operation is essentially the same as that described with reference to FIG. 5.

Figure 8:
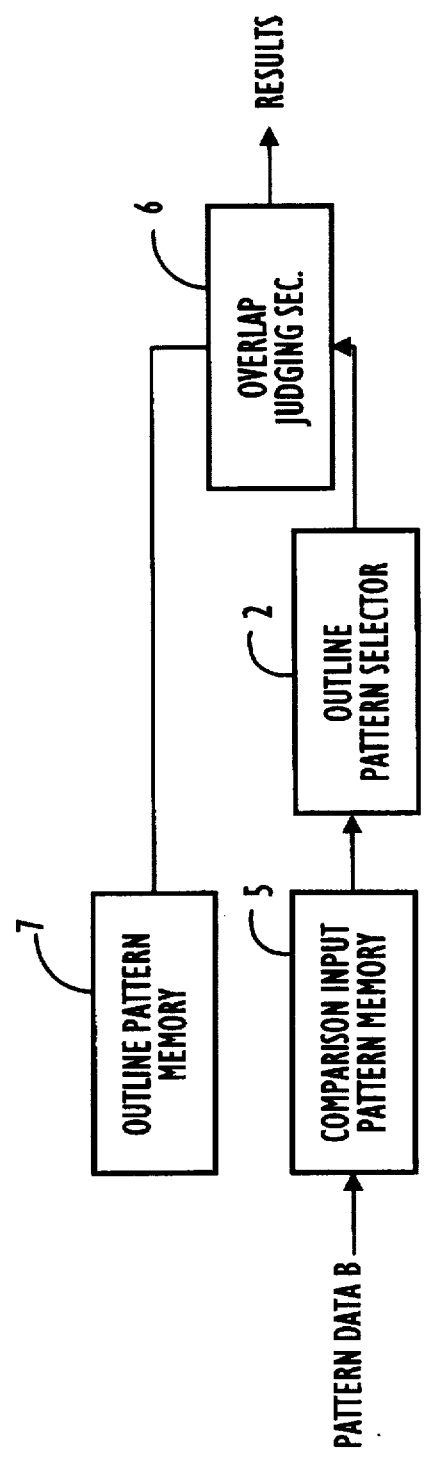
FIG. 8 is a block diagram of an alternative spatial overlapping detection device according to a seventh preferred embodiment of the present invention.

Furthermore, FIG. 8 is a block diagram of a spatial overlapping detection device according to a seventh preferred embodiment of the present invention. Just as the operation of the embodiment shown in FIG. 7 is essentially the same as that described with reference to FIG. 5, the operation of the embodiment shown in FIG. 8 is essentially the same as that described with reference to FIG. 6.

Thus, according to the this embodiment of the present invention, high speed evaluation of pattern distribution overlapping is possible when the reference pattern distribution is fixed.

Figure 9:
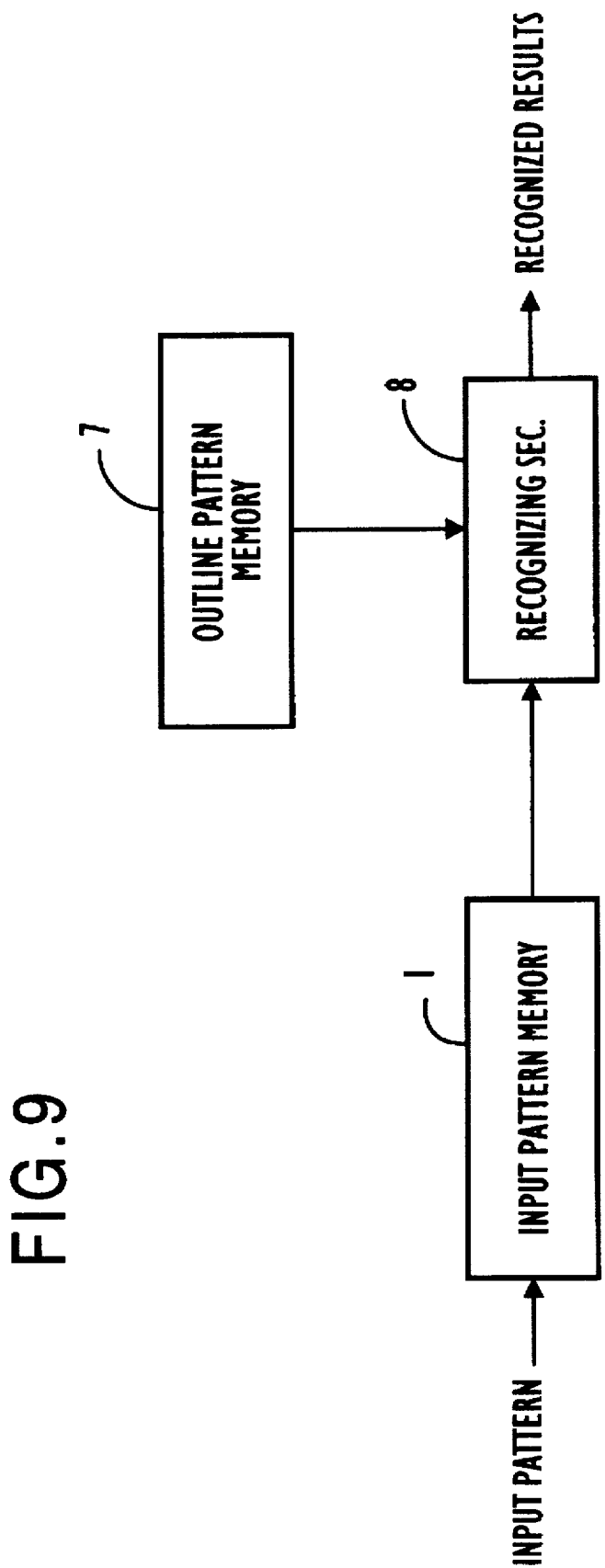
FIG. 9 is a block diagram of a pattern recognition device according to the preferred embodiment of the present invention.

FIG. 9 is a block diagram of a pattern recognition device according to the preferred embodiment of the present invention. As shown in FIG. 9, this pattern recognition device comprises a recognition means 8 which recognizes a pattern in an input pattern memory means 1 using outline pattern data stored in an outline pattern memory means 7.

The basic operation of a pattern recognition device thus comprised according to the present invention is described below.

When designing recognition templates, distribution in a learning data feature vector space is determined, and the feature vectors of the learning data positioned on the outline of the distribution are selected. These feature vectors are stored in the outline pattern memory means 7. The input pattern is then stored in the input pattern memory means 1. The recognition means S determines whether the pattern in the input pattern storage area 1 belongs to a region enclosed by each of the plural pattern data stored in the outline pattern memory means 7; if the pattern does belong to this region, the recognition means 8 determines that this pattern is the same as the pattern represented by the outline pattern.

The basic operation is, as described above, simple. The remaining technical problems are (1) the method for selecting the outline patterns which should be stored in the outline pattern memory means 7, and (2) the method for determining inclusion in the area bounded by the outline pattern data when the plural outline patterns and the input pattern from the input pattern memory means 1 are given.

Of these two problems, the former can be resolved by using the pattern outline data extraction device mentioned above. The basic idea to the second problem is similar to the process shown in the FIG. 13 PAD illustration. Specifically, the representative pattern q is obtained from the outline data, and positioning of the input pattern from the input pattern memory means 1 in FIG. 9 is determined using hyperellipses of which the end points are q and each outline pattern. If the input pattern is within any of the hyperellipses, the recognition means 8 outputs the pattern of the same class as the outline pattern as the recognition result.

Thus, a recognition method using outline data is possible.

By providing a recognition means and outline pattern storage area, recognition considering pattern distributions in a multidimensional feature vector space is possible by means of the present invention.

As described hereinabove, the outline pattern data of a pattern can be extracted with controlled extraction precision according to the present invention. According to another facet of the present invention, the data size can be compressed while retaining the original pattern distribution information. According to a further facet of the present invention, the outline surface of the pattern distribution, i.e., the edge of the pattern distribution, can be obtained from provided pattern data. According to a further facet of the present invention, it can be determined whether two different pattern distributions are spatially overlapping. According to a further facet of the present invention, recognition considering the pattern distribution shape is possible during training. Because of this, application in recognition systems requiring high security where the false recognition rate will remain minimal even if the reject rate rises can be actively pursued because, rather than outputting the recognition result based on simply a short distance, it is possible to determine whether the pattern to be recognized is within the distribution of the learning data, or whether it is outside the distribution of the learning data even though the distance is short.

These functions will become increasingly important in pattern processing, communications, solid image processing, and other applications, and the practical applicability of this invention is accordingly high.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pattern outline data extraction device, for extracting boundary points of a cluster consisting of a plurality of feature points indicative of patterns distributed non-uniformly and discretely in a feature vector space, comprising:

an input pattern memory means which stores data regarding said plurality of feature points contained in said cluster, a geometric figure generation means for generating geometric figures, each enclosed in said feature vector space in such a manner that each of said geometric figures has at least one of said plurality of feature points on the outer periphery thereof, a judging means for judging whether or not each geometric figure contains any of said plurality of feature points inside thereof and for deleting feature points located inside thereof, and an outline extraction means for controlling said geometric figure generation means and said judging means so as to repeat their operation until no feature points are deleted, and for identifying feature points not having been deleted by repetition of their boundary points of said cluster.

2. A pattern outline data extraction device according to claim 1, further comprising:

a representative pattern determination means for determining at least one representative feature point from a distribution of said plurality of feature points, said geometric figure generation means using said at least one representative feature point picked up among said plurality of feature points.

3. A pattern outline data extraction device according to claim 1, further comprising:

a memory means for storing data regarding said boundary points extracted by said outline extraction means as compressed data.

4. An outer surface detection device, for detecting an outer surface of a cluster consisting of a plurality of feature points indicative of patterns distributing non-uniformly and discretely in a feature vector space, comprising:

an input pattern memory means that stores data regarding said plurality of feature points contained in said cluster, a geometric figure generation means for generating geometric figures each enclosed in said feature vector space in such a manner that each of said geometric figures has at least one of said plurality of feature points on the outer periphery thereof, a judgment means for judging whether or not each geometric figure contains any of said plurality of feature points inside thereof add for deleting feature points located inside said each geometric figure, an outline extraction means for controlling said geometric figure generation means and said judgment means so as to repeat their operation until no feature points are deleted, and for identifying feature points not having been deleted by repetition of their operation as said boundary points of said cluster, and an interpolation means for approximating the outer surface of said cluster with hypercurvatures each connecting adjacent boundary points identified by said outline extraction means.

5. A pattern recognition device comprising:

a template memory means for storing data regarding a plurality of outline pattern data predetermined for pattern recognition, an input pattern memory means that stores data regarding a plurality of feature points indicative of patterns distributed non-uniformly and discretely in a feature vector space, a geometric figure generation means for generating geometric figures, each enclosed in said feature vector space in such a manner that each of said geometric figures has at least one of said plurality of feature vectors on the outer periphery thereof, a judging means for judging whether or not each geometric figure contains any of said plurality of feature points inside thereof and for deleting feature points located inside, an outline extraction means for controlling said geometric figure generation means and said judging means so as to repeat their operation until no feature points are deleted and for identifying feature points not having been deleted by repetition of their operation as boundary points of said plurality of feature points, and a recognition means for comparing an outline pattern defined by said boundary points extracted with each of said plurality of outline pattern to one of said plurality of outline patterns by comparing said outline pattern with each of said plurality of outline patterns.

* * * * *

UNITED STATES PATENT AND TRADEMARK OFFICE
CERTIFICATE OF CORRECTION

PATENT NO. : 5,696,844
DATED : December 9, 1997
INVENTOR(S) : Hideyuki TAKAGI et al.

It is certified that error appears in the above-indentified patent and that said Letters Patent is hereby corrected as shown below:

Col. 12, line 17, delete "add" and insert --and--; and line 56, after "outline" and insert --patterns stored in said template memory and for identifying said outline--.

Signed and Sealed this

Twenty-fourth Day of March, 1998

Attest:

BRUCE LEHMAN

*Attesting Officer*   *Commissioner of Patents and Trademarks*